April 25, 1961  R. L. LICH  2,981,206
RAILWAY TRUCK
Filed Feb. 27, 1956  4 Sheets-Sheet 1

INVENTOR
RICHARD L. LICH
BY Rodney Bedell
ATTORNEY

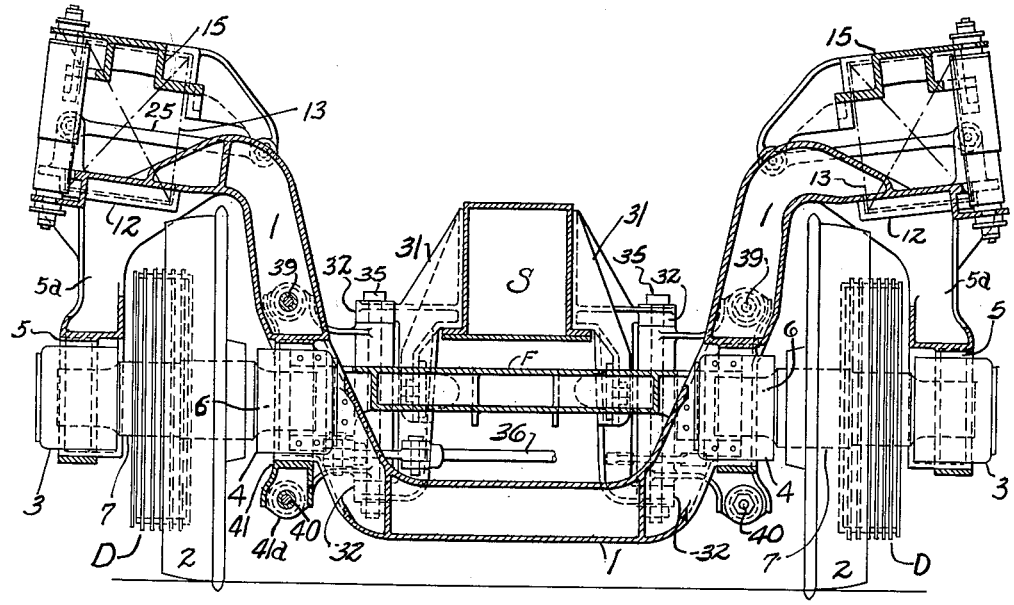

April 25, 1961 R. L. LICH 2,981,206
RAILWAY TRUCK
Filed Feb. 27, 1956 4 Sheets-Sheet 3

INVENTOR
RICHARD L. LICH
BY Rodney Bedell
ATTORNEY.

April 25, 1961 R. L. LICH 2,981,206
RAILWAY TRUCK
Filed Feb. 27, 1956 4 Sheets-Sheet 4

INVENTOR
RICHARD L. LICH
BY Rodney Bedell
ATTORNEY.

United States Patent Office 2,981,206
Patented Apr. 25, 1961

2,981,206

RAILWAY TRUCK

Richard L. Lich, Ferguson, Mo., assignor to General Steel Castings Corporation, Granite City, Ill., a corporation of Delaware Filed Feb. 27, 1956, Ser. No. 567,872

6 Claims. (Cl. 105—182)

The invention relates to railway rolling stock and more particularly to truck structure used under each end of a vehicle body, each truck having at least two wheeled axles, spaced longitudinally of the truck, with journal boxes, individual springs on the journal boxes, and members mounted on the springs and adapted to support the vehicle body.

One object of the invention is to hold the axles of the truck in spaced relation to each other independently of the truck load so that the uncontrollable friction which exists between the usual journal box and frame pedestals is eliminated. Such friction exerts a snubbing action on the springs which is undesirable.

Another object is to avoid the snubbing or blocking out of the truck spring system by braking action.

These general objects are attained by utilizing a floating frame for spacing the wheeled axles but supporting the load-carrying bolster from the wheeled axles independently of the floating frame.

A more detailed object is to facilitate the dropping of the wheels and axles from the truck frame for replacement or repair without undesirable disassembly of other truck parts.

Other detailed objects of the invention will be apparent from the following description, reference being had to the accompanying drawings in which:

Figure 3 is a vertical transverse section on line 3—3 of Figure 1.

Figure 4 is a similar section on line 4—4 of Figure 1.

Figure 1:
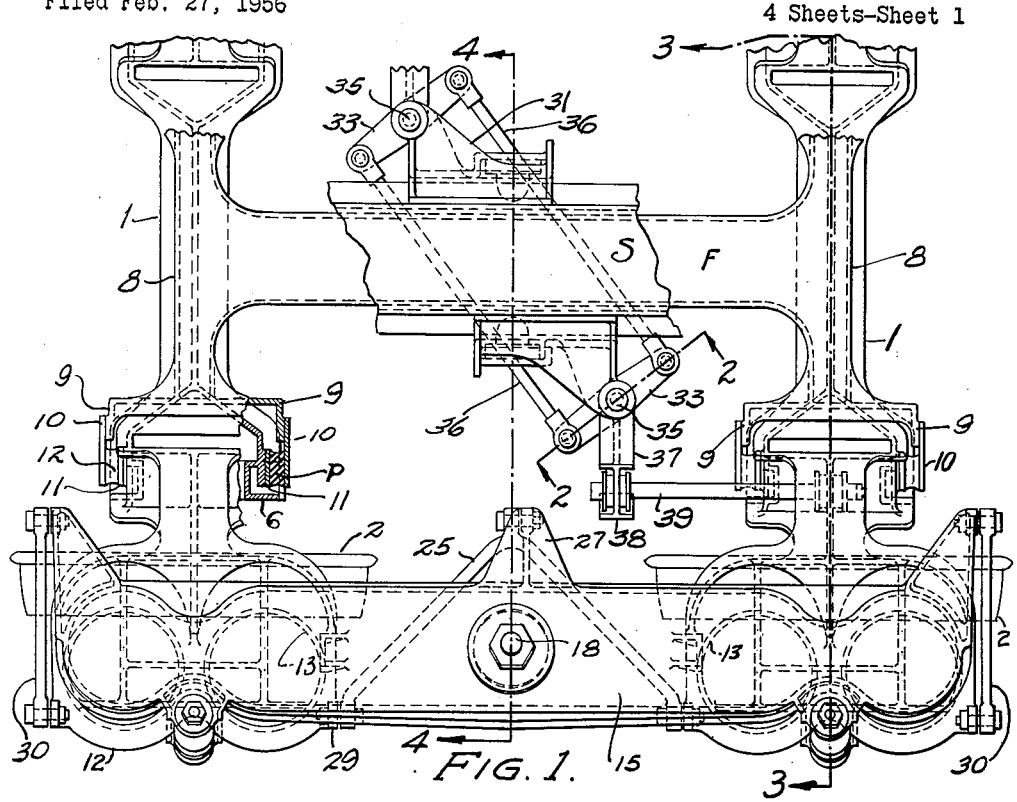
Figure 1 is a top view of the major portion of a two axle or four wheel truck, embodying the invention. A portion is sectioned on line 1—1 of Figure 4.
Figure 2:
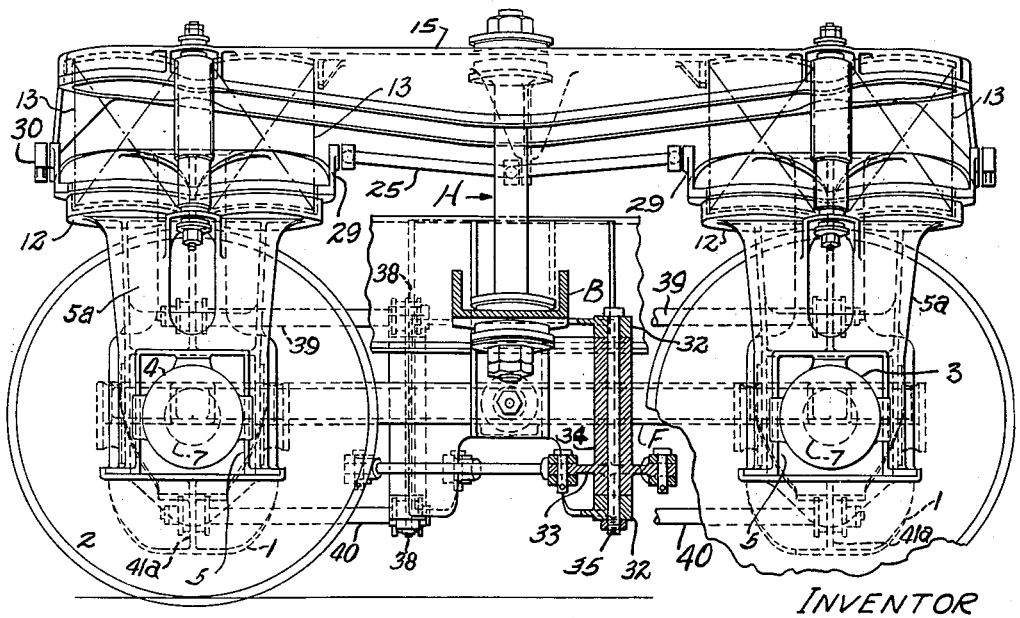
Figure 2 is a side elevation of the same with a portion sectioned on line 2—2 of Figure 1. Also indicated in section is a portion of a vehicle body part indicated by line 2a—2a of Figure 4.
Figure 5:
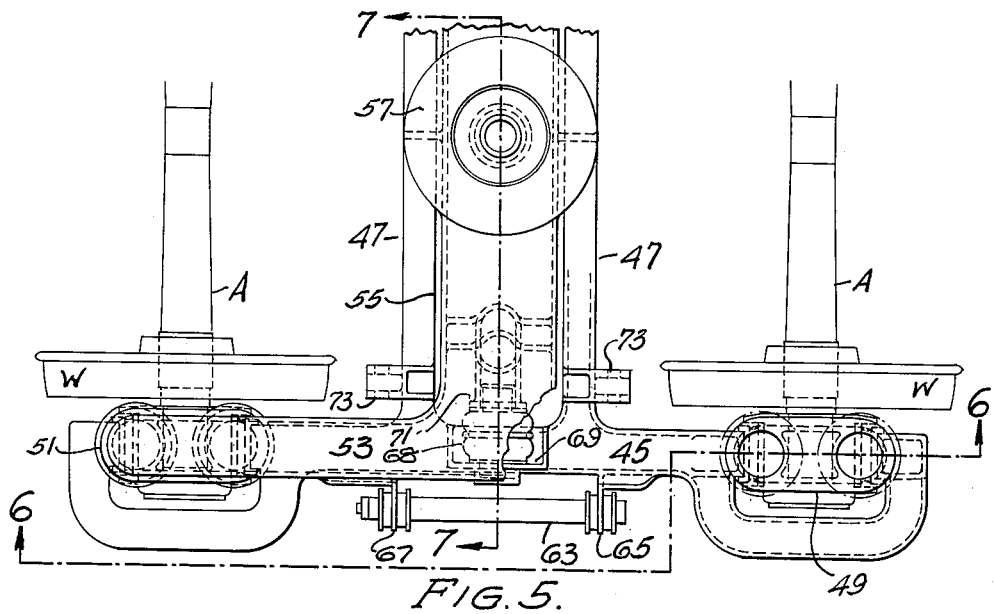

Figure 5 corresponds generally to Figure 1, but illustrates another form of the invention.

Figure 6:
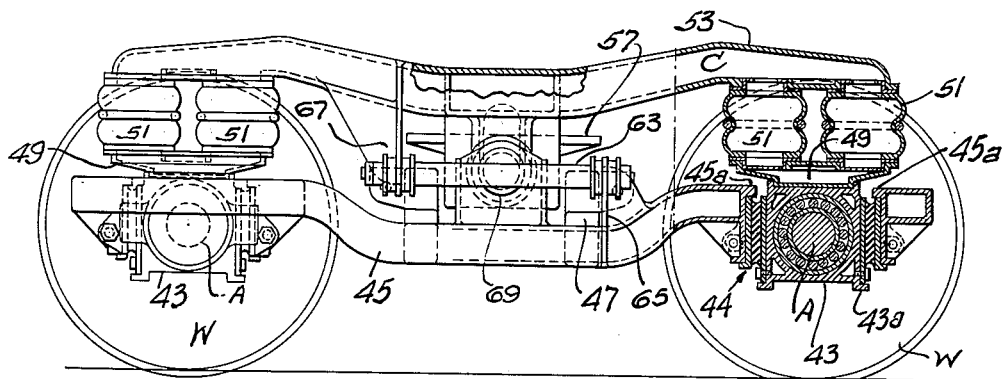

Figure 6 is a side elevation and longitudinal section on line 6—6 of Figure 5.

Figure 7:
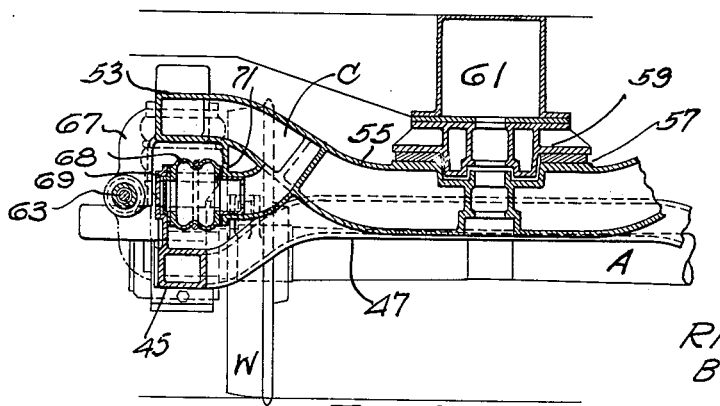

Figure 7 is a vertical transverse section on line 7—7 of Figure 5.

Figure 8:
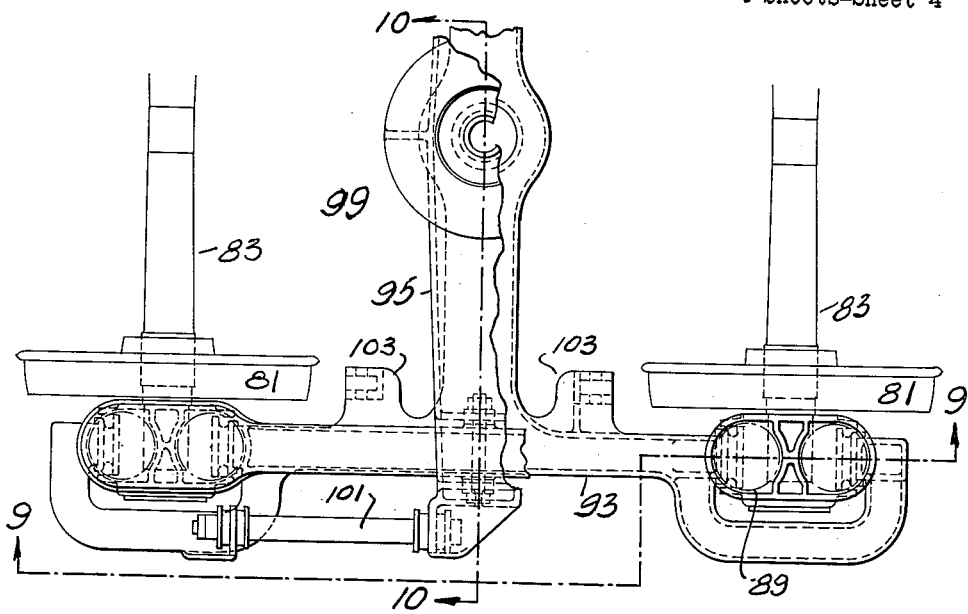

Figure 8 corresponds to Figure 5, but illustrates another form of the invention.

Figure 9:
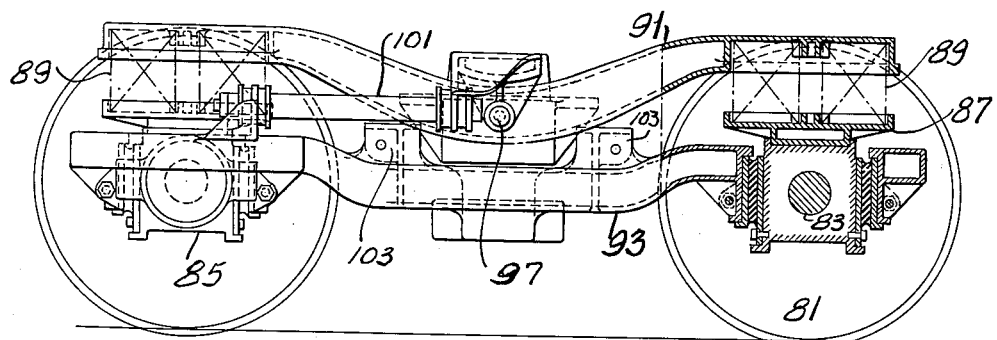

Figure 9 is a vertical longitudinal section on line 9—9 of Figure 8.

Figure 10:
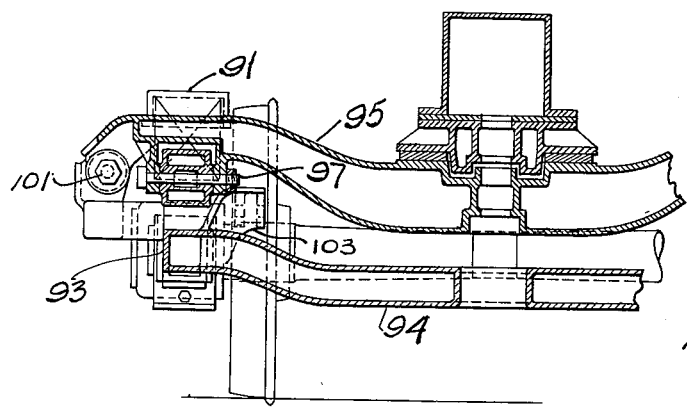

Figure 10 is a vertical transverse section on line 10—10 of Figure 8.

In the structure shown in Figures 1-4, individual axle frames 1, spaced apart longitudinally of the truck, extend transversely of the truck and each forms inverted U end portions extending over corresponding wheels 2 and receiving the latter between the generally upright legs of the U. The lower portions of the U legs rest directly upon journal boxes 3, 4 respectively and have pedestal-like parts 5, 6 receiving the boxes between them. A stub axle 7 on each wheel is journaled in boxes 3, 4.

A truck frame F positions the axle frames 1 relative to each other. Each end of truck frame F has a cross arm 8 terminating at each end in a pair of upright jaws 9 slidably receiving between them the adjacent upright leg of the corresponding axle frame 1. Steel plates 10 and 11 are welded to jaws 9 and the axle frame respectively and a rubber pad P is bonded to each pair of associated plates 10, 11. The axle frames are held against relative movement lengthwise of the truck but may shift relative to each other vertically and transversely of the truck, because of limited distortion in shear of pads P, to accommodate track irregularities.

Each pedestal 5 has a portion 5a extending upwardly from the journal independently of the axle-positioning frame and forming a seat 12 for one or more coil spring units 13. A spring cap 15, elongated longitudinally of the truck, is supported at its end portions upon springs 13. A hanger H is suspended from the intermediate portion of each spring cap 15 and comprises an outer tube 17 and an inner bolt 18, there being a rubber pad 19 between the upper end of tube 17 and cap 15, and there being a rubber pad 20 between the upper end of bolt 18 and cap 15.

The lower end of each hanger H is connected to a bracket B on the lower portion of the body underframe. Pads 21 and 22 correspond to pads 19 and 20 and similarly provide a pivoting and cushioning connection between hanger H and the vehicle body whereby the truck may swivel on the vehicle body and the vehicle body may swing transversely of the truck when the vehicle enters or leaves curved track.

A V-shaped anchor 25 (Figure 1) disposed horizontally is pivotally connected at its angular inner end to a bracket 27 on cap 15 and at the outer ends of its legs to brackets 29 on spring seats 12. A link anchor 30 connects each end of cap 15 to an upstanding bracket on the corresponding end of spring seat 12 and holds the spring cap against movement relative to the spring seat journal box and axle frame transversely of the truck. Anchors 25 and 30 accommodate the spring cap movement vertically relative to the spring seats and axle frames.

For positioning the truck longitudinally of the vehicle body, providing for swiveling of the truck relative to the body, and for preventing tilting of the axle frames in the vertical longitudinal plane of the vehicle, due to brake torque forces, there is provided a torque lever and anchor structure mounted on brackets 31 secured to opposite sides of the body center sill S. Each bracket includes vertically spaced ears 32. Horizontal levers 33, extending diagonally of the center sill, have deep central portions 34 fulcrumed on bracket ears 32 by bolts 35. The outer ends of levers 33 are pivotally connected by links 36 extending diagonally of the center sill. The deep central portion of levers 33 include rigid wings 37 extending transversely of the center sill and are provided with vertically spaced ears 38 (Figure 4). Anchors 39 constructed similar to hanger H connect the upper ears 38 to axle frames 1. Anchors 40 connect the lower ears 38 to flanges 41a on tie bars 41 bridging the lower ends of corresponding pedestals 6 on the axle frames 1. Anchors 39 and 40 hold the axle frames upright and spaced apart lengthwise of the truck while accommodating relative movements of the axle frames and body underframe transversely and vertically of the vehicle.

With this arrangement axle frames 1 are maintained parallel with each other but may pivot about bolts 35 to swivel on the body and accommodate curved track. However, the axle frames cannot move longitudinally of the body nor can they tilt longitudinally of the body. The longitudinal member of the truck frame is positioned between the lower portions of brackets 31 (Figure 4) and the latter are provided with rubber bumpers 42 to cushion but limit the relative movement of truck frame F if the axle frames 1 tend to move transversely of the truck a greater distance than is intended to be accommodated by the yielding of rubber pads 12 in shear.

The structure described provides for the transmission of the body load direct to the axle boxes, through springs 13 and independently of the truck frame F and its connections to transverse axle frames 1.

Figure 3 illustrates the disk brake drums D mounted on stub axles 7, there being cooperating brake shoes, with actuating cylinders (not shown) carried by brackets 1a on the axle frames 1. Accordingly, the action of the load-supporting springs is not affected by frictional engagement of relatively movable parts as in the conventional truck.

The structure illustrated in Figures 5, 6 and 7 includes conventional axle A and wheel W assemblies which mount roller bearing journal boxes 43. An axle positioning frame includes side members 45 and transverse spaced transoms 47. Steel plate and rubber sandwiches 44 are supported on journal box lower lugs 43a and support the truck frame through frame upper lugs 45a. Separately formed spring seats 49 are mounted on journal boxes 43, independently of the axle-positioning frame, and extend upwardly and outwardly over the frame and carry air springs 51 of bellows type. The load-carrying bolster includes side members 53, each mounted upon air springs 51 at opposite ends of the truck, and a transverse member 55 having a relatively large diameter central bearing 57 swivelly mounting a corresponding central bearing 59 on the car body center sill 61.

An anchor 63 extends lengthwise of the truck and is connected at one end to a bracket 65 on truck frame member 45 and at its opposite end to a bracket 67 on the bolster. This anchor corresponds in structure to those shown at H 39 and 40 in Figure 1, and holds the bolster and truck frame against relative movement lengthwise of the truck but yields to the extent necessary to accommodate their relative vertical movement due to the action of springs 51 and to accommodate their relative transverse movement resulting from lateral forces caused by a curved track or horizontal irregularities in the track. Such relative lateral movement is yieldingly resisted and controlled by horizontally disposed air springs 68 confined by seats 69 and 71 on the truck frame and bolster respectively.

Preferably each bolster side member 53 and the adjacent portion of cross member 55 forms an individual hollow chamber C which provides an air reservoir and surge compartment and equalizes the air pressure in all of the associated springs irrespective of variations in thrusts applied at different points.

As in the structure previously described, all of the truck load is transmitted through springs 51 direct to journal boxes 43 and axles A while the truck frame serves to position the axles without being required to transfer any of the load. Therefore the frame may be made lighter than the conventional truck frame and resistance to relative vertical movement between the frame and journal boxes does not affect the springing of the bolster and bolster load. Brake hangers 73 on the truck frame may take the brake torque without affecting the springing action of the bolster and bolster load.

In this construction the wheels, axles and journal boxes may be dropped readily for repair or replacement because the overhanging portions of spring seats 49 will rest upon the jacked up truck side frame and no disassembly of the frame, bolster and springs will be required.

Figures 8, 9 and 10 illustrate another form of the invention in which the wheels 81, axles 83, journal boxes 85 and spring seats 87 correspond to those shown in Figures 5–7 but coil springs 89 are shown mounted on seats 87. An elongated equalizer 91 extends lengthwise of the truck above the frame side members 93 which are connected by integral transoms 94. The load-carrying bolster 95 is pivotally connected at 97 to the intermediate portions of equalizers 91 at opposite sides of the truck. The bolster is stabilized against tilting longitudinally of the truck by the large diameter central bearing 99 and is held against movement longitudinally of the truck relative to the truck frame by one or more anchors 101 corresponding to anchor 63 of the previously described structure. Brake hanger brackets 103 are integral with and extend inwardly from truck frame side members 93.

As far as the transmission of the truck load by bolster 95 to the wheels and axles, free of the truck frame movement, and the elimination of the transmission of brake torque forces to the spring system, the described structure corresponds to those of the previous forms. Hence, all three forms of the invention attain the general objects set forth in the introductory portion of the specification.

The details of the construction may be varied substantially without departing from the spirit of the invention and exclusive use of those modifications coming within the scope of the claims is contemplated.

What is claimed is:

1. In a railway vehicle truck structure, axles spaced lengthwise of the truck with individual wheels and journal boxes, framing positioning said axles relative to each other lengthwise of the truck, individual spring units carried on said journal boxes independently of said axle-positioning framing, a common spring cap at each side of the truck separate from said framing and extending between and carried by the spring units at each side of the truck, and means carried on said spring caps midway of the ends of the truck and forming the sole support for the end of a vehicle body carried by the truck.

2. In a railway truck a wheeled axle with journal boxes, truck frame side members each having parts engaging opposite sides of the corresponding journal box and slidable vertically relative to the box, a separable spring seat mounted directly on top of the box, body supporting springs carried by said spring seats independent of said frame side members, said seats extending upwardly and laterally over said frame parts and normally being spaced above the latter but being engageable therewith to support the spring seat on said frame parts if the wheeled axle and journal box is dropped for removal.

3. In a railway vehicle truck structure, axles spaced lengthwise of the truck with individual wheels and journal boxes, framing positioning said axles relative to each other lengthwise of the truck, spring units supported on said journal boxes independently of said framing, spring caps separate from said framing extending between and carried by the spring units at each side of the truck, individual hangers pivotally suspended from said spring caps intermediate the ends of the latter to swing transversely of the truck, and vehicle body-supporting elements carried by the swinging ends of said hangers.

4. A railway vehicle truck structure according to claim 1 which includes members yieldingly connected to the diagonally opposite ends of the spaced axle frames, and extending therefrom longitudinally of the truck toward the transverse center line of the truck, and parallel links extending diagonally of the truck between the inner ends of and yieldingly connected to said members and provided with upright pivots for attachment to a vehicle body.

5. In combination with a vehicle body having a longitudinal center sill, a horizontal lever at each side of the center sill with an upright fulcrum thereon intermediate the ends of the lever, parallel links pivotally connected to the outer ends of said lever, an arm rigid with and projecting from each lever intermediate its ends and away from said center sill, anchors extending from the outer end of each arm parallel to said center sill, individual wheel mounting frames extending transversely of the center sill and secured to the outer end of said anchors, journal boxes and wheels supporting said axle frames, a spacer frame between said axle frames and movable vertically relative thereto and said journal boxes, and vehicle body-supporting springs on said axle frames and journal boxes.

6. In a railway vehicle truck, a pair of axle frames, framing holding said axle frames spaced apart lengthwise of the truck, a stub axle with journal boxes mounted in each end of each axle frame, wheels on said stub axles, springs carried by the end portions of said axle frames on said journal boxes and axles independently of said framing, a spring cap extending lengthwise of the truck between springs at each side of the truck, and vehicle body supports on said spring caps intermediate the ends of the spring caps, there being connections between said framing and said supports holding the latter against movement relative to each other transversely and longitudinally of the truck, and elongated anchors pivotally connected at their ends to the axle frames and said framing respectively and other anchors pivotally connected at their ends to the spring caps and axle frames respectively, said anchors forming the sole means for positioning said axle frames, framing and spring caps relative to each other transversely and lengthwise of the truck.

References Cited in the file of this patent

UNITED STATES PATENTS

| | | |
|---|---|---|
| 593,153 | Anderson | Nov. 2, 1897 |
| 1,335,225 | Elliott | Mar. 30, 1920 |
| 1,729,113 | Linhardt | Sept. 24, 1929 |
| 2,225,242 | Van Dorn et al. | Dec. 17, 1940 |
| 2,299,560 | Travillia | Oct. 20, 1942 |
| 2,399,519 | Tack | Apr. 30, 1946 |
| 2,741,996 | Kolesa | Apr. 17, 1956 |
| 2,861,522 | Rossell | Nov. 25, 1958 |
| 2,871,800 | Rossell | Feb. 3, 1959 |

FOREIGN PATENTS

| | | |
|---|---|---|
| 415,970 | Italy | Nov. 12, 1946 |